W. P. HEATH AND R. M. WASHBURN.
PROCESS OF AND MEANS FOR PUTTING UP POWDERED MILK AND OTHER FOOD PRODUCTS IN A STERILE ATMOSPHERE.
APPLICATION FILED APR. 12, 1920.
1,406,380. Patented Feb. 14, 1922.
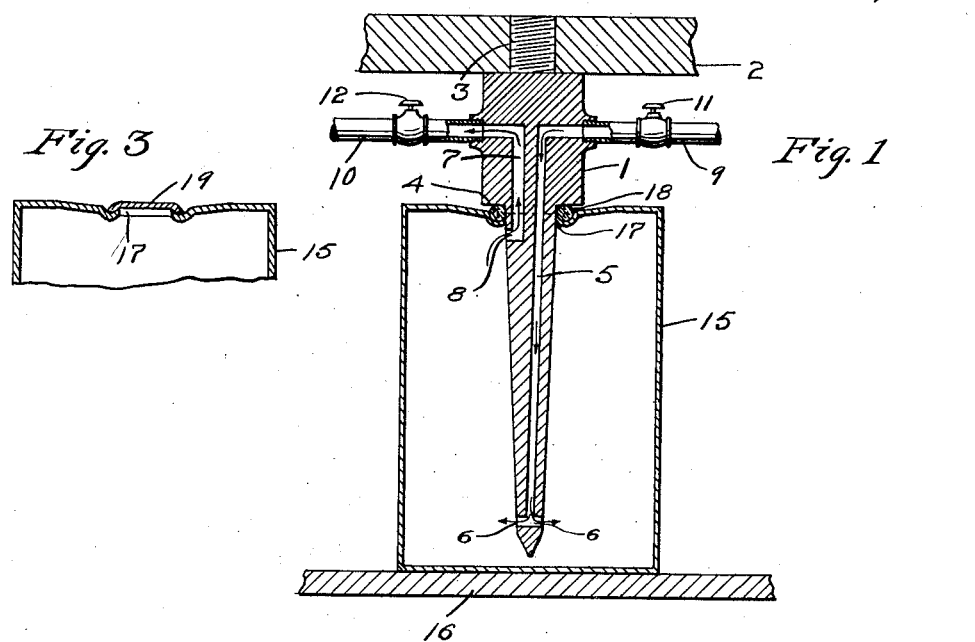
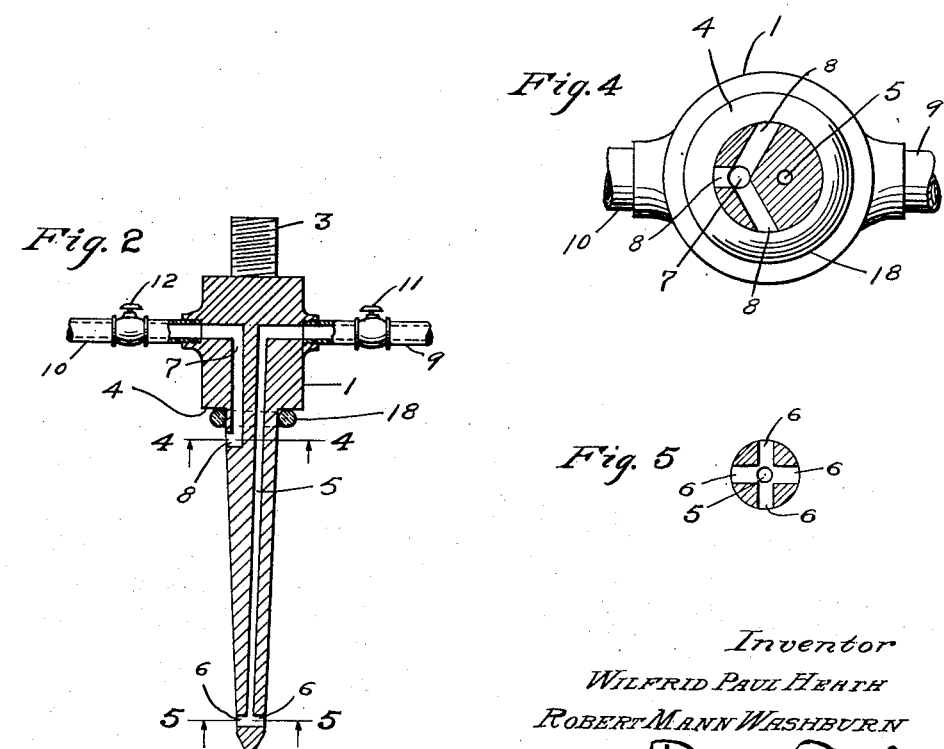
Inventor
WILFRID PAUL HEATH
ROBERT MANN WASHBURN
By Paul & Paul
Their Attorneys

UNITED STATES PATENT OFFICE.

WILFRID PAUL HEATH, OF CHICAGO, ILLINOIS, AND ROBERT MANN WASHBURN, OF ST. PAUL, MINNESOTA.

PROCESS OF AND MEANS FOR PUTTING UP POWDERED MILK AND OTHER FOOD PRODUCTS IN A STERILE ATMOSPHERE.

1,406,380. Specification of Letters Patent. Patented Feb. 14, 1922.

Application filed April 12, 1920. Serial No. 373,310.

*To all whom it may concern:*

Be it known that we, WILFRID PAUL HEATH, a citizen of the United States, residing at Chicago, Cook County, Illinois, and ROBERT MANN WASHBURN, a citizen of the United States, residing at St. Paul, Ramsey County, Minnesota, have invented certain new and useful Improvements in Processes of and Means for Putting up Powdered Milk and other Food Products in a Sterile Atmosphere, of which the following is a specification.

This invention relates particularly to an improved process of and means for putting up powdered milk and other food products, in a sterile atmosphere for storage purposes.

The invention consists generally in a process of and apparatus for putting up such products in an atmosphere of carbon dioxide or other sterile gas.

In the accompanying drawings which illustrate an apparatus embodying our improvements and which may be employed for carrying out our improved process;

Figure 1 is a vertical section through the device, and through a can or container adapted to hold powdered milk, and illustrating the process of applying the gas thereto, Figure 2 is a vertical section showing the device separated from the can in which the product is stored, Figure 3 is a detail showing a section of a portion of the can in connection with which our process may be operated, Figure 4 is a transverse section on line 4—4 of Figure 2, looking in the direction of the arrow.

Figure 5 is a transverse section on line 5—5 of Figure 2, looking in the direction of the arrow.

The main element of our device consists of a bar 1, preferably secured to a plate 2, or other suitable support. As here shown the upper end of the bar 1 is provided with a threaded stem 3 which is screwed into a suitable opening in the plate 2. The bar 1 is preferably provided with a suitable shoulder 4, and its lower portion is made in the form of a tapering plunger adapted to be projected into a can or container of powdered milk, or other food substance, and, preferably, of sufficient length to reach substantially to the bottom thereof. This plunger is provided with a channel or duct 5, preferably extending laterally through the wall of the upper part thereof, and downward through the tapering portion of the plunger, and connecting with exit openings 6 near the lower end thereof. Another channel or duct 7 extends downward in the upper part of the plunger connecting with the openings 8 leading to the exterior thereof, at a point or points preferably a short distance below the shoulder 4. The upper end of the opening 7 extends laterally through the side wall of the upper part of the plunger, as shown in Figures 1 and 2 of the drawings. Suitable pipes 9 and 10 provided with valves 11 and 12 connect with the channels 5 and 7 as shown.

A gas tank that will supply carbon dioxide, or other sterile gas under pressure, is connected to the pipe 9, and an exhaust pump is connected to the pipe 10.

15 represents a can or container having a filling opening 17 at its upper end. This opening is of sufficient size to permit the tapering portion of the plunger 1 to enter therein and to be projected substantially to the bottom of the can. A gasket 18 is preferably arranged upon the tapering portion of the plunger immediately below the shoulder 4, and a cap 19 is provided for sealing the opening in the can.

In operation the can 15 is filled with powdered milk or other food product. The plunger 5 is inserted through the opening 17 in the top of the filled can, and the can is raised, forcing the plunger into the can. If preferred the can may be placed on a stationary support and the plunger moved downward into the can. In either event the plunger is forced through the powder, or the material in the can, and it is designed to extend substantially to the bottom of the can as shown in Figure 1 of the drawings. The gasket 18 seals the opening around the plunger. After the plunger is in position the valve 12 is opened and by means of an air pump or other vacuum producing instrument the greater part of the air in the can is withdrawn through the channel 7. This leaves a rarified atmosphere in the can. The valve 11 is then opened which permits carbon dioxide or other suitable gas under suitable pressure to pass inward through the channel 5 entering the can near the bottom thereof. By means of the partial vacuum on the one hand and the pressure of gas on the other the can is quickly filled with gas. As this gas enters at the bottom and as the gas employed, usually carbon dioxide, is considerably heavier than air, much of the remaining air in the can is forced upward and the most of it passes out of the can through the channel 7.

That portion of the plunger below the shoulder 4 preferably has a very slight or gradual taper to permit gradual release of the gas pressure, as the can is being removed from the plunger. The gradual release of the gas pressure prevents the escape of any material amount of the powdered product.

When the pressure is sufficiently reduced the can may be quickly withdrawn by a downward movement, and a sealing cap 19 may be placed over the opening 17 in the top of the can and quickly soldered in the groove around the said opening.

As there will naturally be a slight outward pressure of gas and as carbon dioxide is materially heavier than air and will not readily mix therewith, no air will re-enter the can during the short interval elapsing between the removal of the plunger and the sealing of the cap. In this operation gas may be used in any amount and at any temperature and pressure at the option of the operator.

While we have particularly specified the use of this process and means in connection with powdered milk, it will be understood that the same process and same device may be employed in putting up other food products in a sterile atmosphere, where such products are of such character that they may be placed in a container and a device applied for forcing the sterile gas into the lower part of the container and thereby forcing out the air in the container.

We claim as our invention:

1. The process of putting up powdered milk or other pulverulent food products for storage consisting in placing a product in a suitable can or container, partially exhausting the air therefrom, introducing carbon dioxide or other sterile gas heavier than air under pressure in the lower part of the container, and thereby forcing the remaining air out of the container, and then sealing the container.

2. The process of putting up powdered milk or other pulverulent food products for storage consisting in placing the product in a suitable can or container having an opening in the upper part thereof, partially exhausting the air from the container through said opening, introducing carbon dioxide or other non-oxidizing sterile gas heavier than air, under pressure, into the lower part of the container, and thereby forcing the remaining air out of the container, and then closing and sealing the opening in the container.

3. The process of putting up powdered milk or other pulverulent food products for storage consisting in placing the product in a suitable can or container having an opening in the upper part thereof, introducing carbon dioxide or other non-oxidizing sterile gas heavier than air, under pressure, into the lower part of the container, and thereby forcing the air out of the container through the opening in the upper part thereof, and then closing and sealing said opening.

4. The process of putting up powdered milk for storage consisting in placing the milk in a suitable can or container, partially exhausting the air from the powdered milk in the container, introducing carbon dioxide under pressure in the lower part of the powder and thereby forcing the remaining air out of the powder and container, and then sealing the container.

5. Means for putting up powdered milk or other food products for storage in a sterile atmosphere, consisting in the combination with a plunger adapted to be inserted into a food container, of means upon said plunger for sealing the opening through which said plunger projects into said container, said plunger being provided with channels or ducts leading from its outer surface above said sealing means to its outer surface below said sealing means, one of said ducts terminating near the sealing means and the other near the end of the plunger, substantially as described.

6. Means for putting up powdered milk and other food products for storage in a sterile atmosphere consisting in combination with a tapering plunger adapted to be inserted into a food container, of means arranged upon said plunger for sealing the opening through which said plunger projects into said container, said plunger being provided with channels or ducts leading from its outer surface above said sealing means to its outer surface below said sealing means, one of said ducts terminating near the sealing means and the other near the end of the plunger.

7. Means for putting up powdered milk and other food products for storage in a sterile atmosphere consisting in combination with a plunger adapted to be inserted into a food container, of means for sealing around said plunger the opening through which the plunger projects into the container, said plunger being provided with ducts leading from above said sealing means to separated points below said sealing means, whereby air may be exhausted from the container into which the plunger projects at a point or points near the sealing means, and carbon dioxide or other sterile gas may be forced into the container near the bottom thereof.

WILFRID PAUL HEATH.
ROBERT MANN WASHBURN.

Witnesses to signature of W. P. Heath:
FRANK J. DOWD,
GUY CARPENTER.

Witnesses to signature of R. M. Washburn:
C. H. REHFUSS,
GENEVIEVE E. SORENSEN.